Patented Dec. 19, 1933

1,940,218

UNITED STATES PATENT OFFICE 1,940,218

CELLULOSE ESTER

Herbert Kranich, West Hempstead, N. Y.

No Drawing. Application July 29, 1931
Serial No. 553,739

12 Claims. (Cl. 260—101)

This invention relates to cellulose, especially to an ester of cellulose, and more particularly to a hydrated sulpho-nitro-cellulose acetate.

A principal object of this invention is the production of a cellulose ester which is soluble in hot or cold 95% pure ethyl alcohol and in other mixtures of water and ethyl alcohol, from 95% ethyl alcohol, to and including absolute, or 100% ethyl alcohol.

A further object of the invention is the production of a substance of the type specified which is not soluble in 70% commercial or pure ethyl alcohol or an ethyl alcohol containing a larger percentage of water.

A further object of the invention is the production of an ester of the type specified which will substantially retain the molar structure of the cellulose material, that is, the cotton yarn from which it is made.

A further object of the invention is the production of a cellulose ester of the type specified which will be much less brisant when burning than is the usual nitro-cellulose.

A further object of the invention is the production of a process by which a cellulose ester of the type specified may be formed by esterification in a single bath.

A further object of the invention is the production of a process for producing a cellulose ester of the type specified by esterification in a bath containing glacial acetic acid, for providing the necessary acetyl groups to the cellulose ester.

Other objects and advantages will appear as the description of a definite ester of the type specified, and the process of making the same progresses, and the novel features will be particularly pointed out in the appended claims.

In order to make an ester of the type specified, that is, a hydrated sulpho-nitro-cellulose acetate, I may start with pure cellulose, acetocellulose, or nitrocellulose. I prefer to start with pure cellulose as my source of cellulose.

In order to make a hydrated sulpho-nitro-cellulose acetate, starting with pure cellulose, I use an esterification bath containing glacial acetic acid, nitric acid, sulphuric acid and water. The preferred proportions of a suitable esterification bath are as follows:

|  | Parts by weight |
|---|---|
| Sulphuric acid (specific gravity 1.84) | 37 |
| Nitric acid (specific gravity 1.42) | 14 |
| Acetic acid, glacial, 99½% | 10 |

This bath is prepared by first thoroughly mixing the sulphuric acid and the nitric acid in a suitable vessel, while maintaining the temperature of the constituents between 25 and 30 degrees centigrade. After the inorganic acids have been properly mixed, the glacial acetic acid is then slowly added, still maintaining the temperature of the bath between 25 and 30 degrees centigrade.

I now take one part, by weight, of air dried pure cellulose (alpha), a well known commercial material, plunge it into the acid mixture and allow it to steep therein for one hour at a temperature of approximately 25 degrees centigrade.

After the esterification of the cellulose is complete, it is removed from the acid mixture and freed as much as possible of adhering liquid. This is best done by means of a centrifuge. As soon as the adhering liquid has been substantially completely removed from the cellulose ester, it is then plunged into water and agitated, then washed with water until entirely free from all trace of acids. It may be further treated by any of the well known applicable commercial methods by which it is rendered more stable.

An acid bath prepared in the manner stated contains 9% to 12% of water. The air dried pure cellulose (alpha) contains from 7% to 10% of water.

The amount of water in the acid bath used for esterification by me is largely determinative of the solubility of my product, in varying proportions of ethyl alcohol and water. The larger the content of water in the acid bath the greater the increase in solubility of the product in the more dilute ethyl alcohol. The less the quantity of water in the acid bath the more necessary it is to use closer and closer approximation to pure ethyl alcohol in order to completely dissolve the product.

One of the principal objects of my invention is to prevent such an alteration in the cellulose that it will go into solution, because if the cellulose or cellulose ester goes into solution in the acid bath, it would be necessary to resort to an expensive and troublesome process, involving precipitation of the cellulose ester by water, in order to obtain the ester, furthermore, an unsuitable product would result.

The proportions of the acid bath, as given by me do not result in a cellulose ester which goes into solution in the acid bath. The proportions of nitric acid and glacial acetic acid should not be varied from those given to an extent sufficient to cause the cellulose to lose its original fibrous structure. The amount by which these proportions may be varied is believed to be rather small, but the maximum allowable variation would have to be determined by experiment for any particular sample of cellulose.

The sulphuric acid in the bath should be substantially as stated, but any tendency of the cellulose or the ester to go into solution should be a warning that the sulphuric acid is probably deficient as a deficiency of this acid results in the tendency of the cellulose to go into solution. If substantially more sulphuric acid is used than that given the time of immersion of the cellulose in the acid bath must be increased so as to obtain a like product to that obtained with the proportions given.

The temperature of the acid bath must be maintained substantially below 40 degrees centigrade because at about this temperature the fibrous cellulose is altered and slowly dissolves in the acid bath. The optimum temperature of 25 degrees centigrade for the esterification may be varied, but if the temperature is lowered the time of immersion must be increased.

A cellulose ester prepared in the manner hereinbefore described would contain sulphur calculated as sulphuric acid from 2% to 3%; acetyl groups, calculated as acetic acid from 6% to 14%; and nitro groups calculated as nitrogen from 7% to 10%. An analysis of one finished product gave the following:

|  | Per cent |
|---|---|
| Sulphuric acid | 2.50 |
| Acetic acid | 6.10 |
| Nitrogen | 9.75 |

The cellulose ester obtained by esterification in the manner hereinbefore described, is soluble in 95% cold or hot ethyl alcohol if sufficiently hydrated. It is also partially soluble in a less dilute ethyl alcohol, if 100% alcohol, it is in all cases completely soluble in the cold. It is insoluble in 70% dilute ethyl alcohol, whether hot or cold. The product is also soluble in 95% methyl alcohol, pure methyl alcohol and pure acetone, and commercial methyl or wood alcohol. It is less inflammable than nitrocellulose. Its solution, on drying, gives tough flexible films.

The product of my esterification process differs from cellulose nitrates, as a group, because they are not soluble in 95% pure ethyl alcohol, and only in rare cases are they soluble in absolute pure ethyl alcohol. Furthermore, as a group, cellulose nitrates are more insoluble in hot solutions than in solvents at normal or lower temperatures. In this respect cellulose nitrates differ from my product because my product, when sufficiently hydrated, is soluble in hot or cold 95% ethyl alcohol.

My product also differs from cellulose acetates, because, the main commercial product, known as secondary cellulose acetate is, when dried, soluble in 70% hot dilute ethyl alcohol. My product is not soluble in such solvent.

The difference between my product and the ordinary cellulose nitrates and cellulose acetates resides in the fact that I have modified the original cellulose molecule by transforming it into a hydrated cellulose molecule, so that in order to be strictly accurate, one should designate my new produce as a hydrated sulpho-nitro-cellulose acetate.

By my method of esterification I may make a series of cellulose esters with a widely varying range of solubility. In order to do this I would use definite proportions of sulphuric acid, nitric acid, glacial acetic acid and cellulose. The varying factor would be the water content. This I might vary between 2 and 25% in the acid bath. The higher the water content, the greater the solubility; whereas the lower the water content, the greater the insolubility. By making the specified variation, I may obtain cellulose esters whose solubilities range from complete solubility in water to complete insolubility in acetone and the plastic solvents.

It is desired to call particular attention to the fact that my esterification bath contains glacial acetic acid, but does not require the presence of acetic anhydride, which the art considers necessary in a bath used for acetylating cellulose or nitrocellulose.

By varying the time of immersion of the cellulose in the acid bath, I vary the acetyl content and the nitrogen content, in such a way, that, as the time of immersion increases, the acetyl content increases and the nitrogen content decreases. The effect upon solubility is shown by the solubility of the product, both in hot or cold ethyl or methyl alcohol, becoming less and less as the time of immersion increases.

Although I have particularly described one particular definite product, and variations thereof, and one particular definite process, and variations thereof, for manufacturing my new product, nevertheless, I desire to have it understood that the particular products and processes described are merely by way of description but not by way of limitation of my invention, and they do not exhaust the possibly physical embodiments of the idea of means underlying my invention.

What I claim as new and desire to secure by Letters Patent of the United States, is:

1. The article of manufacture, sulpho-nitro-cellulose acetate, containing about 2–3% sulphuric acid, 6–14% acetic acid, and 7–10% nitrogen.

2. The material, hydrated sulpho-nitro-cellulose acetate containing 2%–3% of sulphuric acid, 6%–10% acetic acid, and 7%–10% nitrogen.

3. The material, hydrated sulpho-nitro-cellulose acetate, containing about 2.5% of sulphur calculated as sulphuric acid soluble in hot or cold 95% pure ethyl alcohol.

4. The material hydrated sulpho-nitro-cellulose acetate, containing about 2.5% of sulphur calculated as sulphuric acid soluble in hot or cold ethyl alcohol and dilute ethyl alcohol containing up to 5% water.

5. The material hydrated sulpho-nitro-cellulose acetate, containing about 2.5% of sulphur calculated as sulphuric acid soluble in hot or cold ethyl alcohol and dilute ethyl alcohol containing up to 5% water and insoluble in hot or cold 70% dilute ethyl alcohol.

6. The process of steeping cellulose in a mixture of about 37 parts by weight of sulphuric acid, specific gravity 1.84; about 14 parts nitric acid, specific gravity 1.42; and about 10 parts glacial acetic acid, 99½%.

7. The process of converting cellulose into an ester which includes steeping the cellulose in a mixture of 14 parts of nitric acid, 10 parts of 99½% glacial acetic acid, and 37 parts of sulphuric acid of specific gravity 1.84, at about 25 degrees centigrade for about one hour so that the cellulose does not substantially lose its molar structure.

8. The process of forming a cellulose ester which comprises forming a mixture of 37 parts by weight of sulphuric acid, specific gravity 1.84; 14 parts nitric acid, specific gravity 1.42 at a temperature maintained between 25 degrees and 30 degrees centigrade, then adding glacial acetic acid, 99½%, slowly while maintaining the temperature between 25 degrees and 30 degrees centigrade, then adding one part by weight of air dried pure alpha cellulose and allowing it to steep therein for one hour at a temperature of about 25 degrees centigrade and then freeing the cellulose product from adhering acids.

9. The process of forming a cellulose ester which comprises forming a mixture of 37 parts by weight of sulphuric acid, specific gravity 1.84; 14 parts nitric acid, specific gravity 1.42 at a temperature maintained between 25 degrees and 30 degrees centigrade, then adding glacial acetic acid, 99½%, slowly while maintaining the temperature between 25 and 30 degrees centigrade, then adding one part by weight of air dried pure alpha cellulose and allowing it to steep therein for one hour at a temperature not above 40 degrees centigrade and then freeing the cellulose product from adhering acids.

10. A process for forming a definite solubility cellulose ester which comprises esterifying cellulose in a mixed acid bath of a definite water content containing 37 parts by weight of sulphuric acid, specific gravity 1.84, about 14 parts nitric acid, specific gravity 1.42, and about 10 parts glacial acetic acid, 99½%.

11. A process for forming a cellulose ester which comprises immersing cellulose in a mixed acid bath containing 37 parts by weight of sulphuric acid, specific gravity 1.84, about 14 parts nitric acid, specific gravity 1.42, and about 10 parts glacial acetic acid, 99½% and varying the water content thereof in accordance with the solubility desired in the final product.

12. A process for forming a cellulose ester which comprises immersing cellulose in a bath composed of glacial acetic, nitric and sulphuric acids containing 37 parts by weight of sulphuric acid, specific gravity 1.84, about 14 parts nitric acid, specific gravity 1.42, and about 10 parts glacial acetic acid, 99½% and varying the water content thereof in accordance with the solubility desired in the final product.

HERBERT KRANICH.